May 20, 1958  E. E. RIGNEY  2,835,294
VEGETABLE CORING DEVICE
Filed Jan. 12, 1956  2 Sheets-Sheet 1
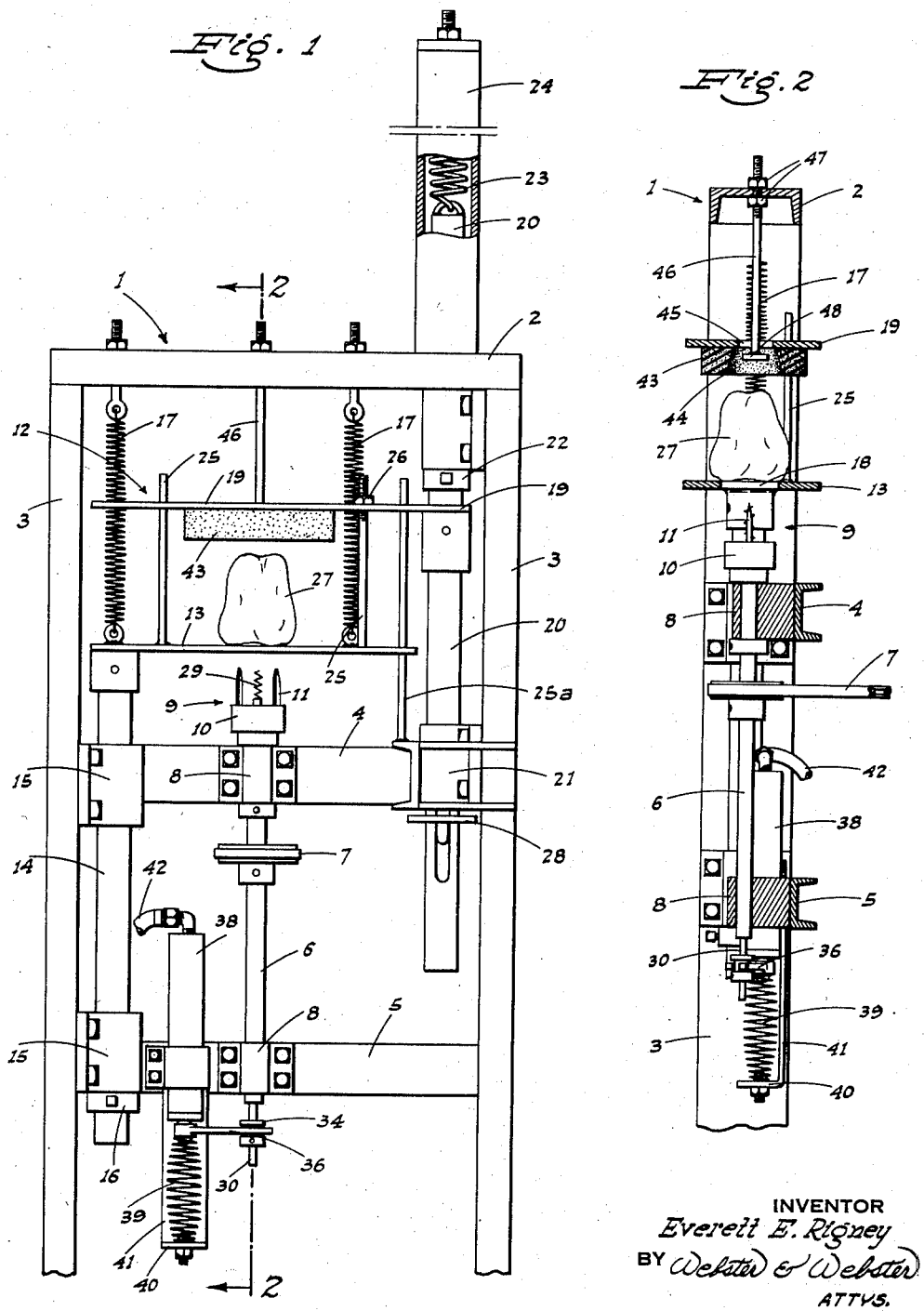
INVENTOR
Everett E. Rigney
BY Webster & Webster
ATTYS.

May 20, 1958

E. E. RIGNEY 2,835,294

VEGETABLE CORING DEVICE

Filed Jan. 12, 1956

INVENTOR
*Everett E. Rigney*
BY *Webster & Webster*
ATTYS.

United States Patent Office 2,835,294
Patented May 20, 1958

2,835,294

VEGETABLE CORING DEVICE

Everett E. Rigney, Oxnard, Calif., assignor to Gentry Division, Consolidated Foods Corporation, a corporation of Maryland Application January 12, 1956, Serial No. 558,711

9 Claims. (Cl. 146—52)

This invention relates in general to food machinery, and particularly represents improvements in the bell-pepper coring device shown in my United States Patent No. 2,495,422.

The present invention is directed to, and it is a major object to provide, an improved coring unit for the device, and which unit is especially adaptable for use with, and to remove the core of, bell-peppers of the pimiento type.

Another object of the present invention is to provide a novel coring unit, as in the preceding paragraph, which includes a power actuated, retractible core engaging screw which is engaged with and withdraws the stem end and core from the pepper after the cutting operation and has been completed.

An additional object of this invention is to provide the coring device with an improved pepper holding assembly which includes a cushion pad formed with a cavity to receive the apex of the pepper, and to locate and hold the pepper during the coring operation; there being novel means to cause positive discharge of the pepper from said cavity as the holding assembly returns to its starting position.

It is also an object of the present invention to provide improvements, as above, which are designed for ready and economical embodiment in a coring device of the type shown in the above identified patent.

Still another object of the invention is to provide practical and reliable improvements in a vegetable coring device which will be exceedingly effective for the purpose for which they are designed.

These objects are accomplished by means of such structure and relative arrangement of parts as will fully appear by a perusal of the following specification and claims.

In the drawings:

Fig. 1 is a front elevation of the vegetable coring device embodying the present improvements; the view showing a pepper as initially supported in the device, but before downward travel of the holding assembly.

Fig. 2 is a transverse vertical section taken on line 2—2 of Fig. 1.

Figure 3:
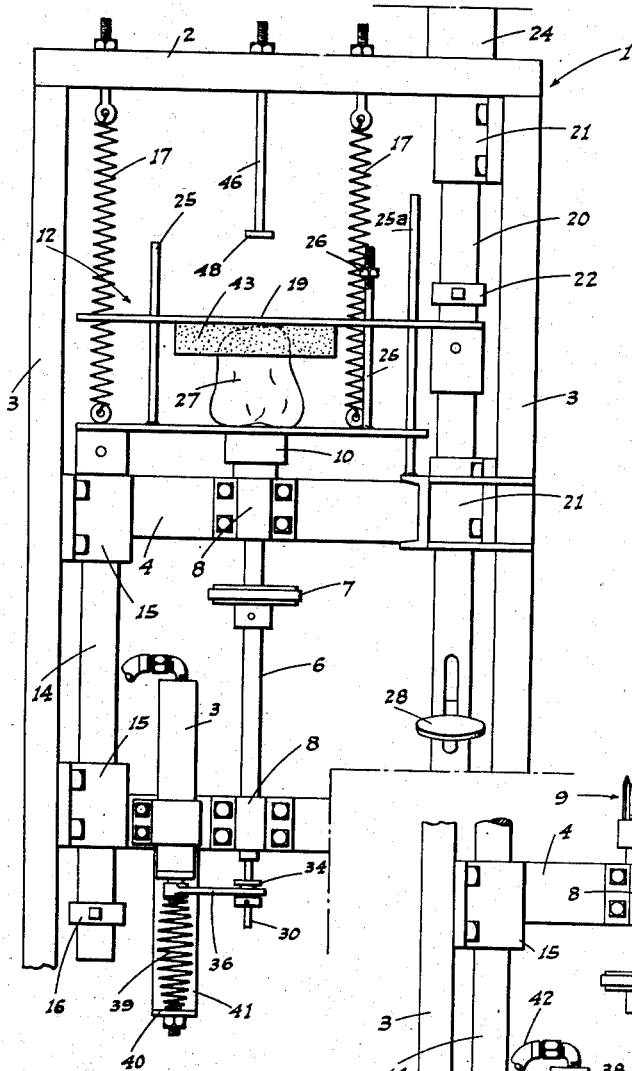
Fig. 3 is a view similar to Fig. 1, but shows the holding assembly in its lowered position and with the pepper in the position in which it is engaged by the coring unit.
Figure 5:
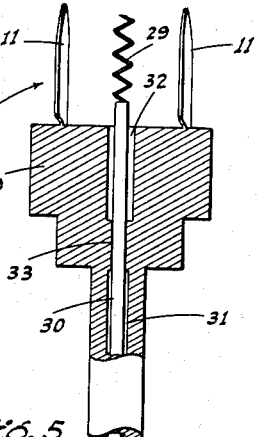
Fig. 5 is an enlarged fragmentary elevation, mainly in section, showing the core unit detached; the screw being shown in its normal or initial position.

Referring now more particularly to the drawings, and to the characters of reference marked thereon, the device—just as in my above identified patent—includes an upstanding open frame, indicated generally at 1, and wherein there is a top cross beam 2, end posts 3, and vertically spaced cross beams 4 and 5 intermediate the top and bottom of said frame.

Between the posts the device is provided with a vertical spindle 6 driven from a suitable motor (not shown) by means of an endless drive 7; the spindle being carried in bearings 8 on the cross beams 4 and 5.

The spindle 6 terminates directly above the cross beam 4 and is there fitted with a rotary coring unit, indicated generally at 9.

The coring unit 9 includes a rotary head 10, and upstanding blades 11 disposed in radially spaced relation to, and on opposite sides of, the axis of said head.

In position normally above the rotary coring unit 9 the device incorporates a pepper holding assembly, indicated generally at 12, which comprises the following:

A horizontal bottom plate 13 extends transversely of the device and is carried at one end on the upper end of a vertical slide bar 14 journaled for sliding movement in the frame 1 through bearings 15. A stop collar 16 on the lower end of the slide bar 14 limits upward movement thereof to the position shown in Fig. 1. The horizontal bottom plate 13 is normally urged in an upward direction, and to the limit of its movement, by a pair of relatively light-weight suspension springs 17 attached to opposite end portions of the plate 13 and the top cross beam 2.

The bottom plate 13 is formed with a central opening 18 directly above the coring unit 9, and such opening is of a diameter so that said coring unit may pass upwardly therethrough.

Above and in symmetrical relation to the bottom plate 13 the pepper holding assembly 12 includes a horizontal, transversely extending top plate 19 secured at one end in connection with a vertical slide bar 20 guided in bearings 21 on the side of frame 1 opposite the slide bar 14. A stop collar 22 limits upward movement of the top plate 19 to the position shown in Fig. 1; the slide bar 20, together with said top plate 19, normally being urged upwardly to the limit of its movement by means of a suspension spring 23 connected between the upper end of the slide bar 20 and the top of a tubular housing 24 into which said slide bar projects.

Guide rods 25 are fixed on the bottom plate 13 adjacent its ends and extend upwardly in slidable relation through the top plate 19; a nut 26 being threaded on the upper end of one of said guide rods so as to assure of lifting of the bottom plate to its normal or starting position when the top plate 19 rises to its starting position, as shown in Fig. 1. Another guide rod 25a is fixed at its lower end in frame 1 and projects upwardly in relatively slidable relation through the plates 13 and 19.

When said plates 13 and 19 are in their normal or starting position, as in Fig. 1, they are spaced apart sufficiently for the entry of a pepper (or pimiento) 27 therebetween, with the stem end of said pepper directly over the opening 18, and with the opposite end or apex of the pepper disposed some distance below the top plate 19.

The slide bar 20 is moved in a downward direction, to actuate the holding assembly 12, by the same means and in exactly the same manner as contemplated in my above identified patent; such means including a depressible, lever mounted hand plate 28. It is recognized, however, that the slide bar can be worked by a power device, such as a valve controlled fluid pressure power cylinder (not shown) connected between the frame 1 and said bar 20 in a suitable manner.

The improvements in the coring device as described above, and which improvements are the subject of the present invention, pertain to the rotary coring unit 9 and the pepper holding assembly 12.

With respect to the rotary coring unit 9, it includes—in the present embodiment—an open or spiral type screw 29 which normally upstands axially from the rotary head 10; i. e., in a center position half way between the upstanding blades 11. The screw 29 is fixed on the upper end of a vertical shaft 30 slidable in a central or longitudinal bore 31 which extends through the spindle 6 and head 10.

Within the rotary head 10, and for a distance from the top thereof downwardly at least the length of screw 29, the bore 31 is enlarged, as at 32; this to the end that upon downward sliding of shaft 30 in bore 31 the screw 29 may be retracted entirely into said head 10.

Below the enlarged portion 32 of bore 31, the bore is squared, as at 33, as is the shaft, so that the latter rotates with the spindle 6 and head 10 thereon.

The lower portion of the shaft 30 projects below the spindle 6, and is there fitted with a circumferentially grooved collar 34 in which a fork 35 engages; said fork being formed on the outer end of a horizontal arm 36 which is fixed to, and radiates from, a downwardly projecting piston rod 37 of a vertically disposed, fluid pressure actuated power cylinder 38. The power cylinder 38 is clamped to the cross beam 5, and normally the piston rod 37 is retracted or in a raised position; such position being yieldably maintained by a compression spring 39 engaged between the lower end of the piston rod 37 and a foot 40 on a bracket 41 which depends from said cross beam 5. The power cylinder 38 is adapted to be actuated, to cause downward movement of the piston rod 37, by means of a valve controlled, fluid pressure conduit system, indicated in part at 42.

With respect to the pepper holding assembly 12, it is improved in the present embodiment by the attachment of a cushion pad 43 to the under side of the top plate 19, and such cushion pad is formed with a downwardly opening cavity 44 positioned to receive the apex of a pepper 27 supported on the bottom plate 13 directly over the central opening 18. The cavity 44 opens to—and registers at the top with—a central opening 45 in said top plate 19.

A fixed depending push-out rod 46 is secured by nuts 47 to the top cross beam 2; said rod being positioned so that it is in axial alinement with the opening 45, and its length is such that the lower end portion of said rod normally projects into the cavity 44. A circular head 48 is fixed on the lower end of the rod 46; the diameter of the head being such that it can pass, freely, relatively upwardly through the opening 45.

*Operation*

After a bell-pepper or pimiento 27 is seated on the bottom plate 13 over the central opening 18, the device operates as follows to effect coring of said pepper or pimiento.

With the coring unit 9 being rotated by the drive 7, the vertical bar 20 is slid downwardly by the hand plate 28, and—just as before—this results first in an initial downward movement of the top plate 19. When this occurs the head 48 relatively withdraws from the cavity 44, and the apex of the pepper 27 engages in said cavity of the cushion pad 43 in locating and holding relation; the cushion pad frictionally engaging the pepper 27 to prevent it from spinning.

Next, and with continued downward sliding movement of the bar 20, the top plate 19 and bottom plate 13—i. e. the entire holding assembly 12—moves downwardly a further distance, with the result that the coring unit 9 works relatively upwardly through the central opening 18. When this occurs the upstanding blades 11 cut through the stem end of the supported pepper 27 and also cut about the core of said pepper. Simultaneously, the screw 29 runs centrally through the core of the pepper, whereupon said core turns with the coring unit 9.

Figure 4:
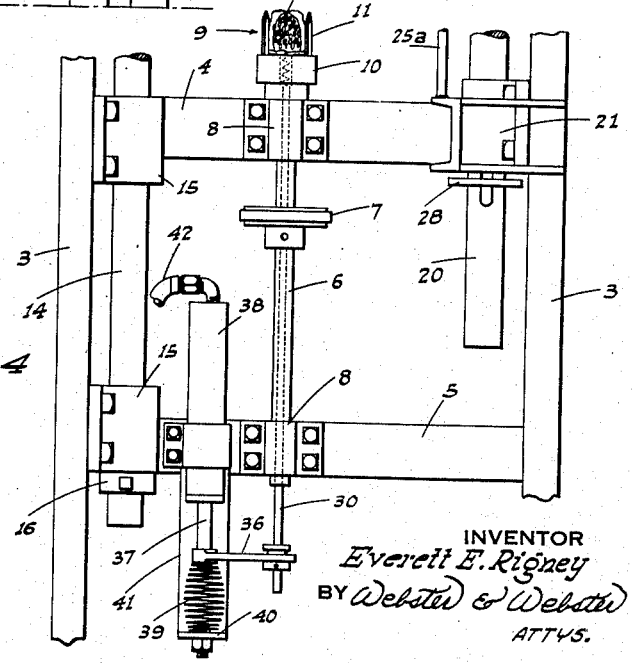
Fig. 4 is a fragmentary front elevation showing particularly the coring unit, with the core thereon and after return of the holding assembly to its initial or raised position.

Thereafter, the hand plate 28 is released so that the holding assembly 12 returns or raises to its initial or starting position. When this occurs the core of the pepper, and which core is indicated at C in Fig. 4, remains on the coring unit (see Fig. 4), and is effectively withdrawn from the pepper 27 which raises with the holding assembly 12.

After raising of the holding assembly 12, and at which time the push-out rod 46—including its head 48—re-enters the cavity 44 to release the cored pepper from the cushion pad 43, the power cylinder 38 is actuated to cause downward travel of the piston rod 37.

Upon such downward travel of the piston rod 37 a corresponding motion is imparted to the slidable shaft 30, with the result that the screw 29 is retracted into the enlarged portion 32 of bore 31. With such retraction of the screw 29 the core C is stripped thereoff and then—as it is free—is discharged centrifugally from the coring unit.

The power cylinder 38 is then returned to its normal position, retracting the piston rod 37, and returning the screw 28 to its projecting position for the next operation.

In the present disclosure of the coring device the various safety appliances illustrated in my above identified patent are retained, but such appliances are here omitted for the sake of clarity.

From the foregoing description it will be readily seen that there has been produced such a device as will substantially fulfill the objects of the invention, as set forth herein.

While this specification sets forth in detail the present and preferred construction of the device, still in practice such deviations from such detail may be resorted to as do not form a departure from the spirit of the invention, as set forth herein.

Having thus described the invention the following is claimed as new and useful, and upon which Letters Patent are desired:

1. In a coring device, for vegetables or the like, which includes a frame, a driven coring unit journaled on the frame for rotation about an upstanding axis, a downwardly movable vegetable holding assembly initially disposed above the coring unit, said assembly being adapted to support a vegetable against upward movement relative thereto and with one end downwardly exposed relative to and in alinement with the coring unit, and means to cause relative lowering of the holding assembly to a position in which said unit cores the supported vegetable; the coring unit embodying a rotary head, a blade upstanding from the head in offset relation to its axis, a screw normally upstanding from the head centrally thereof, a driven spindle journaled on the frame, the head being on the upper end of the spindle, the latter having an axial bore therein and extending through the head, a shaft slidable in the bore but driven from the spindle, the screw being fixed on the upper end of the shaft, the upper end portion of the bore being of a diameter for retraction of the screw thereinto, and means to slide the shaft downward to an extent to retract the screw into said upper end portion of the bore.

2. In a coring device, for vegetables or the like, which includes a frame, a driven coring unit journaled on the frame for rotation about an upstanding axis, a downwardly movable vegetable holding assembly initially disposed above the coring unit, said assembly being adapted to support a vegetable against upward movement relative thereto and with one end downwardly exposed relative to and in alinement with the coring unit, and means to cause relative lowering of the holding assembly to a position in which said unit cores the supported vegetable; the coring unit embodying a rotary head, a blade upstanding from the head in offset relation to its axis, a screw normally upstanding from the head centrally thereof, a driven spindle journaled on the frame, the head being on the upper end of the spindle, the latter having an axial bore therein and extending through the head, a shaft slidable in the bore but driven from the spindle, the screw being fixed on the upper end of the shaft, the upper end portion of the bore being of a diameter for retraction of the screw thereinto, and means to slide the shaft downward to an extent to retract the screw into said upper end portion of the bore; said last named means including a fluid pressure actuated power cylinder mounted on the frame parallel to the spindle, the cylinder including a piston rod, and a connection between the piston rod and shaft arranged to impart the motion of said rod to the shaft without restricting rotation of the latter.

3. In a coring device, for vegetables or the like, which includes a frame, a driven coring unit journaled on the frame for rotation about an upstanding axis, a downwardly movable vegetable holding assembly initially disposed above the coring unit, said assembly being adapted to support a vegetable against upward movement relative thereto and with one end downwardly exposed relative to and in alinement with the coring unit, and means to cause relative lowering of the holding assembly to a position in which said unit cores the supported vegetable; the coring unit embodying a rotary head, a blade upstanding from the head in offset relation to its axis, a screw normally upstanding from the head centrally thereof, a driven spindle journaled on the frame, the head being on the upper end of the spindle, the latter having an axial bore therein and extending through the head, a shaft slidable in the bore but driven from the spindle, the screw being fixed on the upper end of the shaft, the upper end portion of the bore being of a diameter for retraction of the screw thereinto, the shaft depending from the lower end of the spindle, a fluid pressure actuated power cylinder mounted on the frame parallel to but offset from the spindle, the power cylinder including a piston rod in substantially the horizontal plane of the depending end of the shaft, a radial arm on the piston rod projecting toward said depending end of the shaft, and a rotary but axially fixed connection between the radial arm and said depending end of the shaft whereby the power cylinder when actuated is operative to lower the shaft and retract the screw into said upper end portion of the bore.

4. In a coring device, for vegetables or the like, which includes a frame, a driven coring unit journaled on the frame for rotataion about an upstanding axis, a downwardly movable vegetable holding assembly initially disposed above the coring unit, said assembly being adapted to support a vegetable against upward movement relative thereto and with one end downwardly exposed relative to and in alinement with the coring unit, and means to cause relative lowering of the holding assembly to a position in which said unit cores the supported vegetable; the coring unit embodying a rotary head, a blade upstanding from the head in offset relation to its axis, a screw normally upstanding from the head centrally thereof, a driven spindle journaled on the frame, the head being on the upper end of the spindle, the latter having an axial bore therein and extending through the head, a shaft slidable in the bore but driven from the spindle, the screw being fixed on the upper end of the shaft, the upper end portion of the bore being of a diameter for retraction of the screw thereinto, the shaft depending from the lower end of the spindle, a fluid pressure actuated power cylinder mounted on the frame parallel to but offset from the spindle, the power cylinder including a piston rod in substantially the horizontal plane of the depending end of the shaft, a radial arm on the piston rod projecting toward said depending end of the shaft, and a rotary but axially fixed connection between the radial arm and said depending end of the shaft whereby the power cylinder when actuated is operative to lower the shaft and retract the screw into said upper end portion of the bore; there being a spring arranged to yieldably resist such lowering of the shaft.

5. A coring device, as in claim 4, in which the power cylinder is mounted for downward travel of the piston rod, and a bracket on the frame having a foot alined with the piston rod but disposed below the point of maximum travel of said rod; the spring being of compression type and engaged between the piston rod and said foot.

6. In a coring device for vegetables or the like, which includes a frame, a driven coring unit journaled on the frame for rotation about an upstanding axis, a downwardly movable vegetable holding assembly initially disposed above the coring unit, said assembly being adapted to support a vegetable against upward movement relative thereto and with one end downwardly exposed relative to and in alinement with the coring unit, and means to cause relative lowering of the holding assembly to a position in which said unit cores the supported vegetable; the holding assembly embodying a top member and a bottom member in vertically spaced relation, the supported vegetable being disposed between said members and seating on the bottom one thereof, the top member being mounted for downward movement relative to the bottom member and being initially so moved by said means in advance of downward motion of said assembly as a unit, a cushion pad on the under side of the top member initially clear of but positioned for engagement with the adjacent end of the supported vegetable upon such initial downward movement of said top member, the top member and cushion pad being formed with vertical openings therethrough, the opening in the cushion pad being a cavity for reception of said adjacent end of the supported vegetable, and a vegetable push-out element mounted on the frame and depending into said openings from above when the top member and cushion pad return to their initial position.

7. A coring device, as in claim 6, in which the frame includes a rigid part above the holding assembly; said push-out element being a rod fixed to and depending from said part, and an enlarged head on the lower end of the rod; the openings in the top member and cushion pad being of a diameter to permit free movement of the head therethrough.

8. In a coring device, for vegetables or the like, which includes a frame, a driven coring unit journaled on the frame for rotation about an upstanding axis, a downwardly movable vegetable holding assembly initially disposed above the coring unit, said assembly being adapted to support a vegetable against upward movement relative thereto and with one end downwardly exposed relative to and in alinement with the coring unit, and means to cause relative lowering of the holding assembly to a position in which said unit cores the supported vegetable; the holding assembly including vertically spaced plates mounted on the frame for initial lowering movement of the top plate relative to the bottom plate followed by lowering movement of the assembly as a unit, said means being operative to cause said movements, a cushion pad on the under side of the top plate and the supported vegetable being seated on the bottom plate with the upper end of the vegetable initially clear of the cushion pad but being engaged thereby upon said initial lowering movement of the top plate; and said coring unit including a rotary head, a blade upstanding from the head in offset relation to its axis, and a screw normally upstanding from the head centrally thereof, there being an opening in the bottom plate over which the vegetable is seated and the coring unit working through said opening upon lowering of the holding assembly.

9. A coring device, as in claim 8, in which the cushion pad is formed with a downwardly opening cavity in which the upper end of the vegetable engages upon said lowering movement of the top plate; and in which the screw is mounted for retraction into the head; there being push-out means to eject the engaged end of the vegetable from the cavity when the top plate returns to its initial position, and means to cause such retraction of the screw.

References Cited in the file of this patent

UNITED STATES PATENTS

| | | |
|---|---|---|
| 1,595,953 | Leavitt | Aug. 10, 1926 |
| 1,766,824 | Jones | June 24, 1930 |
| 2,036,779 | Sharpe | Apr. 7, 1936 |
| 2,495,422 | Rigney | Jan. 24, 1950 |
| 2,506,802 | Magnuson et al. | May 9, 1950 |
| 2,649,878 | Coons | Aug. 25, 1953 |